US009141496B2

(12) United States Patent
Radulescu

(10) Patent No.: US 9,141,496 B2
(45) Date of Patent: Sep. 22, 2015

(54) METHODS AND SYSTEMS FOR TESTING ELECTRICAL BEHAVIOR OF AN INTERCONNECT HAVING ASYMMETRICAL LINK

(75) Inventor: Andrei Radulescu, Eindhoven (NL)

(73) Assignee: ST-ERICSSON SA, Plan-les-Ouates (CH)

( * ) Notice: Subject to any disclaimer, the term of this patent is extended or adjusted under 35 U.S.C. 154(b) by 243 days.

(21) Appl. No.: 13/878,329

(22) PCT Filed: Oct. 14, 2011

(86) PCT No.: PCT/EP2011/068024
§ 371 (c)(1),
(2), (4) Date: May 22, 2013

(87) PCT Pub. No.: WO2012/049309
PCT Pub. Date: Apr. 19, 2012

(65) Prior Publication Data
US 2013/0238935 A1     Sep. 12, 2013

Related U.S. Application Data

(60) Provisional application No. 61/393,553, filed on Oct. 15, 2010.

(51) Int. Cl.
*G06F 11/00* (2006.01)
*G06F 11/22* (2006.01)
*G06F 11/25* (2006.01)
*G06F 13/42* (2006.01)
*G06F 11/36* (2006.01)

(52) U.S. Cl.
CPC ............. *G06F 11/221* (2013.01); *G06F 11/25* (2013.01); *G06F 11/3672* (2013.01); *G06F 13/426* (2013.01)

(58) Field of Classification Search
CPC ....... G06F 11/22; G06F 11/221; G06F 11/25; H04B 3/00; H04B 3/46; H04B 17/00; H04B 17/0085; H04L 12/2697; H04L 43/0847; H04L 43/50
See application file for complete search history.

(56) References Cited

U.S. PATENT DOCUMENTS

| 2005/0108458 A1 | 5/2005 | Vogt |
| 2005/0154946 A1 | 7/2005 | Mitbander et al. |
| 2008/0192814 A1* | 8/2008 | Hafed et al. .................. 375/224 |

OTHER PUBLICATIONS

Buchmann, Michael and Muller, Markus; "SLVS Test Chip for the MIPI Physical Layer;" 2006; Nokia Research Center NRC-TR-2006-007; retrieved from the Internet on Feb. 5, 2015 at <http://research.nokia.com/files/tr/NRC-TR-2006-007.pdf>; 7 pages.*
International Search Report issued in corresponding International application No. PCT/EP2011/068024, mailing date Jan. 16, 2012.

* cited by examiner

*Primary Examiner* — Alford Kindred
*Assistant Examiner* — Joseph Kudirka
(74) *Attorney, Agent, or Firm* — Patent Portfolio Builders PLLC

(57) ABSTRACT

Methods and devices for testing a physical layer (PHY) of an asymmetrical interconnect interface using a traffic generator/analyzer (TGA) are described. At least one special PHY test sequence is transmitted to the asymmetrical interconnect interface during link start up to place the device under test in PHY testing mode in which the TGA is used to generate and analyze data. The asymmetrical interconnect interface can then receive a configuration command and configure the asymmetrical interconnect interface in response to the configuration command. The asymmetrical interconnect interface can then use the TGA to transmit test sequences to, or receive test sequences from, e.g., a tester, on at least one identified lane of the asymmetrical interconnect device, which at least one identified lane is set by the configuration command.

20 Claims, 4 Drawing Sheets

METHODS AND SYSTEMS FOR TESTING ELECTRICAL BEHAVIOR OF AN INTERCONNECT HAVING ASYMMETRICAL LINK

TECHNICAL FIELD

The present invention relates generally to digital circuits and more specifically to testing systems and methods associated with interconnects.

BACKGROUND

Electronic devices, such as mobile phones, personal computers, personal digital assistants, and many others, utilize processors, memories, input/output (I/O) and other digital devices in order to provide their designed functionality to end users. These various digital devices are connected to one another using interconnects (also sometimes referred to as "busses" or "interfaces"), which convey data, signals and commands between or among the various devices.

Some interconnects, like many other electrical devices, are specified by standards. For example, in the Mobile Industry Processor Interface Alliance (MIPI), several standards are defined. One of these standards is called UniPro (Unified Protocol), which is aimed at chip-to-chip networks using high-speed serial links. UniPro is defined to be a general purpose protocol that solves the general interconnect problems, such as error handling, flow control, routing or arbitration. UniPro is intended to increase the flexibility of phone manufacturers by mixing and matching chips with different functionalities, potentially from different vendors for easy creation of new devices.

For high-speed serial interfaces, interface testing typically consists of two parts, PHY testing of the electrical behaviour of the interface and protocol testing of the protocol behaviour of the interface. PHY testing is typically done using logic analyzers which can produce and capture signals with a detailed timing accuracy, and analyze whether the captured signals match the desired behaviour. Protocol testing is typically done assuming the PHY works, and uses an enhanced protocol implementation at the tester side, which inserts specific protocol patterns that can drive the Device under Test (DuT) into various corner cases.

The reason for this split in the testing process is the different nature of the two testing phases. The PHY testing needs electrical and timing accuracy. However, a tester for PHY testing is not capable of handling protocol interaction, which could be fairly complex. Protocol testing needs a high level of interactivity, and the ability to generate "ill" patterns to drive the DuT in various corner cases. However, a tester for protocol testing is not capable of electrical or timing accuracy, and assumes a working PHY for raw data transport. These types of interface testing can be used for various purposes, including testing for debug, conformance testing and production testing.

Currently, PHY testing is done using loopback. This is possible as the existing high-speed interfaces, such as PCI Express, HyperTransport or RapidIO, are symmetrical. Symmetrical, in this context, means that the two directions of a link are used with the same set of parameters, such as the number of lanes, the data rates, the encoding, etc. As a result of this symmetry of these existing interfaces or interconnects, the data sent on the link from the tester to the DuT (UpLink) can be streamed back to the tester using the other direction of the link (DownLink).

The loopback mechanism is a simple yet effective means to test a high-speed interface with a symmetrical usage of the incoming and the outgoing parts of the link. However, recently, interfaces have emerged in which the usage of the UpLink and DownLink is asymmetrical. Examples of such interfaces are UniPro$^{SM}$ [UniPro] and LLI, which are standardized in the MIPI Alliance [MIPI]. UniPro$^{SM}$ offers support for both D-PHY [D-PHY] and M-PHY [M-PHY] Physical Layers, also defined in the MIPI Alliance. LLI is built on top of M-PHY.

Both UniPro$^{SM}$ and LLI allow an asymmetrical usage of the link in the sense that the UpLink and DownLink may have different static capabilities (e.g., different number of lanes, different speed capabilities). Moreover, even if the UpLink and DownLink have the same static capabilities, they may be configured differently (e.g., different number of lanes, different speed or power modes).

When the interface is asymmetrical, the loopback does not provide enough testing coverage anymore. For example, if the UpLink only has low-speed capabilities, and the DownLink offers high-speed capabilities, the high-speed cannot be effectively tested because the data cannot be provided at the speed required by the DownLink. Similar speed mismatches also show up when the UpLink has fewer lanes than the DownLink.

One other issue with an asymmetrical usage of the link is that the DownLink requires individual configuration. This is, it cannot follow the configuration of the UpLink like in the symmetrical link case. Therefore, the DuT has to offer means to have its DownLink PHY individually configured (e.g., the power mode), and the Tester has to have the means to configure the DuT. This PHY configuration has to be simple enough to be usable with a standard logical analyzer, which does not support complex protocol interaction.

Accordingly, it would be desirable to provide methods, nodes and systems for interconnect link testing, e.g., for M-PHY links in UniPro systems.

BRIEF DESCRIPTION OF THE DRAWINGS

The accompanying drawings illustrate exemplary embodiments, wherein.

ABBREVIATIONS AND ACRONYMS LIST

Figure 1:
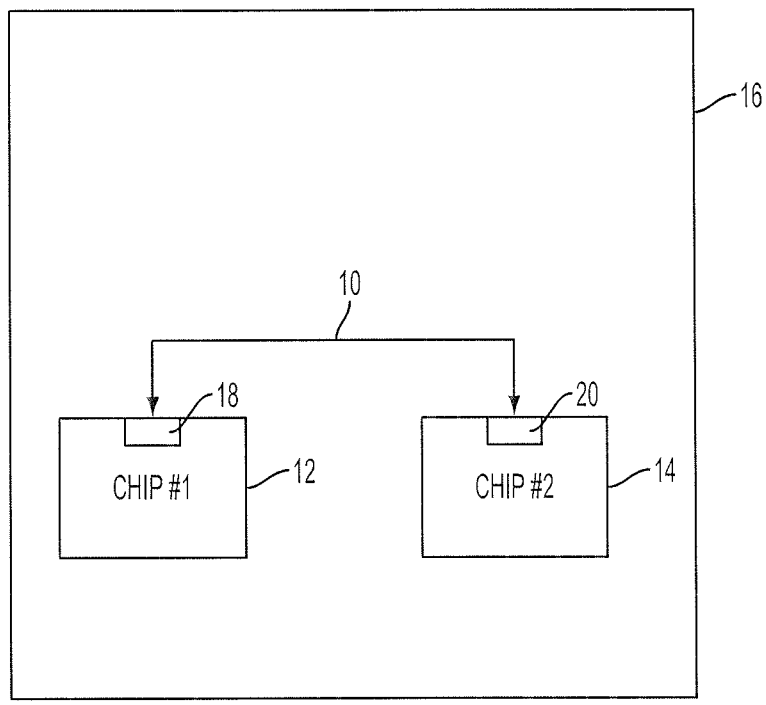
FIG. 1 is a high level block diagram depicting two devices which communicate via an interconnect and which can use link startup protocols according to these exemplary embodiments to establish a communication link therebetween.

DownLink Part of the interface link where data is transmitted from the DuT to the Tester DuT Device under Test
G1 Gear 1. Speed range (PHW) or fixed rate (high speed) communication supported by the M-PHY
MK0 M-PHY MARKER0 (K.28.5)
MK1 M-PHY MARKER1 (K.28.3)
PACP PHY Adapter Configuration Protocol
PHY Physical layer of an interface
POR Power-On Reset
PRBS Pseudo-Random Byte Sequence
PWM Pulse Width Modulation. Bit modulation scheme carrying the data information in the duty-cycle, and explicit clock information in the period
TGA Traffic Generator/Analyzer
UpLink Part of the interface link where data is transmitted from the Tester to the DuT

SUMMARY

According to embodiments, testing of asymmetrical interfaces can be performed using traffic generator/analyzers (TGA). A PHY testing mode can be established when the asymmetrical interconnect interface receives at least one PHY testing sequence from, e.g., a tester, during link-startup. The asymmetrical interconnect interface can also receive a configuration command and configure itself for testing based on instructions in the configuration command. At this point, testing can be performed by transmitting or receiving test sequences using the TGA, on at least one identified lane of an asymmetrical interconnect device, which at least one identified lane is set by the configuration command.

According to another embodiment, a device includes an asymmetrical interconnect interface configured for physical layer (PHY) testing by receiving at least one PHY testing sequence during link-startup and entering, in response to the at least one PHY testing sequence, a PHY test mode where a traffic generator/analyzer (TGA) is used to transmit and receive data (e.g., instead of the normal data path), wherein the asymmetrical interconnect interface is further configured to receive a configuration command and to configure the asymmetrical interconnect interface in response to the configuration command and the asymmetrical interconnect interface including a transceiver configured to use the TGA to transmit or receive test sequences on at least one identified lane of an asymmetrical interconnect device, which at least one identified lane is set by the configuration command.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

An alternative to loopback is the usage of a traffic generator/analyzer (TGA) for testing. Such a TGA is used in UniPro[SM] for protocol testing. However, such a TGA is not directly usable for the PHY testing, as it involves the full protocol stack which cannot be handled by a traffic analyzer. According to exemplary embodiments, a traffic generator/analyzer (TGA) is used instead of a loopback also for PHY testing by adapting the interface during PHY testing. For example, the interface can use an extended link startup sequence to put the interface into either a PHY test mode or the protocol mode. In the PHY test mode, the DuT offers a very simple PHY & TGA configuration mechanism, and uses TGA for PHY testing. In the PHY testing mode, the interface uses a TGA to transmit and receive data instead of the normal data path through L2, L3 and L4. In protocol mode, the TGA is inactive, and the interface is used for regular data transfer.

In order to provide some context for discussion of the exemplary embodiments, some information is first provided about UniPro protocols and systems in which these exemplary embodiments can be used. However it will be understood by those skilled in the art that exemplary embodiments of the present invention include, but are not limited to, usage in UniPro standardized systems. More generally, embodiments can be applied to test asymmetrical interconnect interfaces, i.e., interconnect interfaces which consist of or can be configured to use different numbers of lanes for transmitting and receiving data, (or devices having such interfaces) using a TGA.

As generally shown in FIG. 1, a UniPro interconnect (or bus or interface) 10 can, for example, be used to connect groups, (e.g., pairs or other multiples up to 128) of devices (e.g., chips 12 and 14) within composite device or system 16, such as a mobile phone. Data packets which are conveyed over the interconnect or link 10 from, e.g., chip 12 to chip 14, can subsequently be routed to other destination chips or modules within the composite device 16 using a UniPro switch (not shown in FIG. 1). The devices 12 and 14 will, in this exemplary embodiment, each include a UniPro+M-PHY interface 18 and 20, also called a UniPort-M, and interconnect 10 can be implemented using a bidirectional dual simplex link, i.e., a link having one or more unidirectional PHY lanes in both directions. UniPorts-M 18 and 20 allow up to four lanes per direction, with each lane in a single direction having the same power and speed capabilities; however, the two directions of the link can have different capabilities. In this context, a "lane" can be considered to be a point-to-point, serial link operating in one transmit direction.

Among other things, UniPorts-M 18 and 20 differ from existing interconnect interfaces with respect to, among other things, the flexibility that they permit in creating and configuring a link 10. For example, UniPorts-M 18 and 20 supports asymmetrical links, as opposed to PCI Express, RapidIO and HyperTransport which require the two directions of the link to be fully symmetrical (i.e., both directions of the link have the same number of lanes). UniPorts-M 18 and 20 will also allow only some of its lanes to be connected and there are no restrictions on how the lanes are connected, since the lanes are renumbered during the link startup as will be described below. In this context, the term "connected", as it refers to lanes, means physically connected. For example, suppose that chip 12 is a chip that offers a UniPort-M 18 with four lanes but is used in a system 16 in which it is attached to a chip 14 with more limited connectivity, e.g., having only two receive lanes. As a result, two of the lanes available for chip 12 are intentionally left physically unconnected. Lanes may also be accidentally unconnected due to physical errors between chips (e.g., in the circuit board or flex foil). UniPorts-M 18 and 20 also support asymmetrically configured links (e.g., the two directions of the links can be set in different power and/or speed modes), as opposed to PCI Express, RapidIO and HyperTransport which require the two directions of the link to be in the same power and speed mode.

Figure 2:
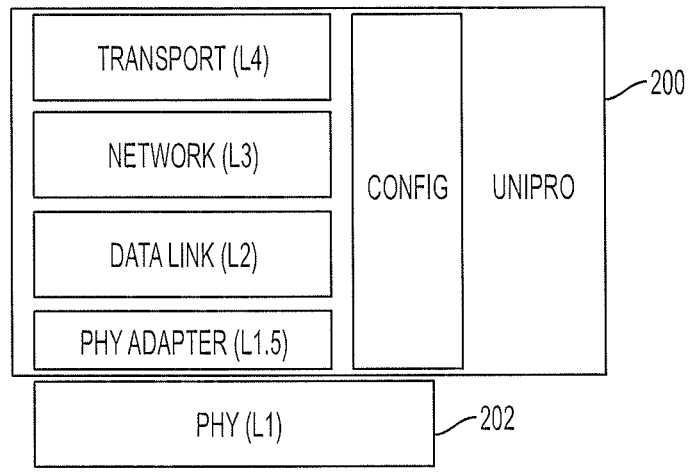
FIG. 2 shows a stack protocol and physical layer associated with an interconnect according to an exemplary embodiment.

In FIG. 2, the UniPro protocol stack 200 and PHY 202 are depicted. The PHY 202 is the mixed signal analog design that ensures the transfer of bits at a high speed (Gbits per second per lane range). The PHY 202 is the part of the interconnect that is subject to testing according to this exemplary embodiment. Examples of PHYs include the M-PHY [M-PHY] and D-PHY {D-PHY], which are standardized in the MIPI Alliance [MIPI]. The UniPro [UniPro] protocol is an example of the protocol, typically implemented in digital logic (but parts could be implemented in software as well) due to the supported high data rates. The protocol functionality includes data packetization, detecting and correcting PHY transmission errors, flow control, data prioritization, and configuration.

Figure 3:
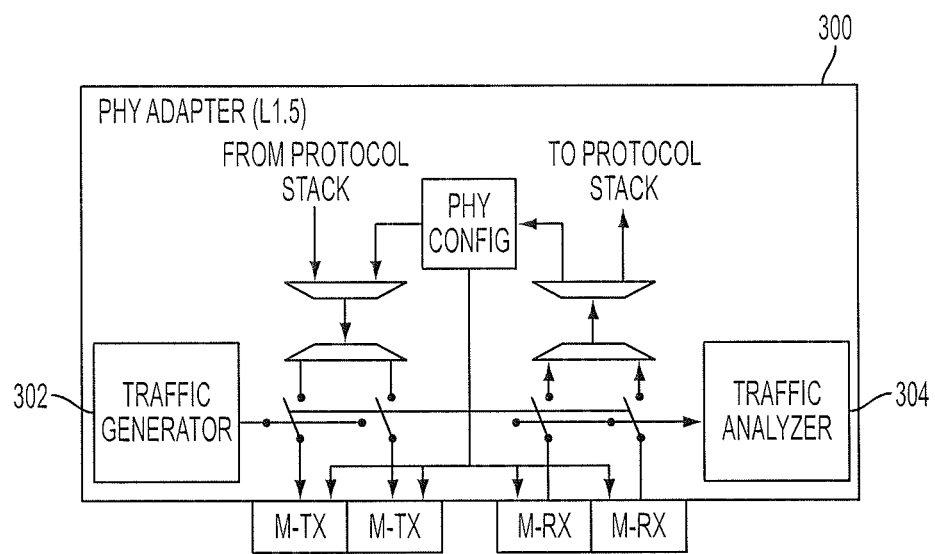
FIG. 3 illustrates a physical adapter layer within the protocol stack of FIG. 2 in more detail according to an exemplary embodiment.

In FIG. 3, elements of the bottommost stack of the protocol 200 (i.e., the PHY Adapter 300) are depicted. The UpLink and DownLink are shown on the right-hand and left-hand sides of FIG. 3, respectively. The UpLink is shown to use two M-PHY lanes (M-RX), and the DownLink is shown to use two M-PHY lanes (M-TX). Both UpLink and DownLink are linked through configurable switches to either be connected to the protocol stack or the Traffic Generator 302/Analyzer 304 modules, collectively "TGA" 302/304.

At reset, the PHY Adapter 300 is configured to let the data be sent/received through the protocol stack. The PHY Adapter uses a link startup sequence, such as the one described in U.S. patent application Ser. No. 12/696,657, the disclosure of which is incorporated here by reference, to ensure a peer device is connected and active at the other end of the link. According to this exemplary embodiment, the link startup sequence is extended with an additional pattern to force DuT in the PHY test mode.

Figure 4:
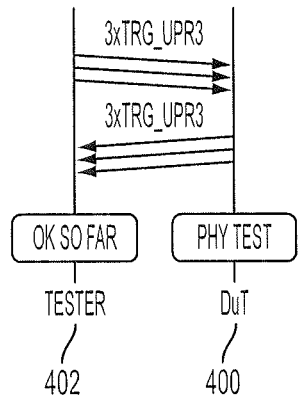
FIG. 4 shows signaling associated with entering a PHY test mode according to an exemplary embodiment.

The link startup sequence typically starts with, for example, the devices 12 and 14 exchanging an initial sequence TRG_UPR0. As a result, after power-on reset (POR) or interface reset, a DuT will start sending TRG_UPR0 and expect to receive TRG_UPR0 to enter the protocol mode. In this phase, if a special PHY-test-mode sequence TRG_UPR3 is received, the DuT enters the PHY test mode and confirms it by sending TRG_UPR3 sequences back to the Tester, as shown for example in FIG. 4. Therein, the DuT 400 can for example be device 12 and Tester 402 can for example be device 14. Alternatively, the Tester 402 can be a separate test device which is connectable to either devices 12 or 14.

The data transmission during the link startup is subject to transmission errors. Given that the full link startup cannot be used due to the limitations of the traffic analyzers, the link startup for PHY testing is kept to a minimum, and is limited to only TRG_UPR3 exchanges. The Tester 402 only sends its TRG_UPR3 sequence when the DuT 400 is known to be powered on and initialized (e.g., by detecting TRG_UPR0 sequences at the DownLink). At that time, the Tester starts sending the TRG_UPR3 sequence. To address the possible transmission errors, the TRG_UPR3 sequence can be sent, for example, 3 times. The DuT 400 only enters the PHY test mode after it has seen all 3 TRG_UPR3 sequences. In an alternative embodiment, the DuT enters PHY test mode after it has seen at least one of the 3 TRG_UPR3. To acknowledge that it successfully entered PHY test mode, the DuT 400 sends 3 TRG_UPR3 sequences as well.

The TRG_UPR3 sequence(s) can be transmitted simultaneously on all lanes between the devices, some of the lanes or, alternatively, on only a single lane. For M-PHY, the transmission starts by simultaneously sending MK0 (encoded as K.28.5 by M-PHY) on all lanes, followed by 3 TRG_UPR3. The TRG_UPR3 could be defined as MK1 (encoded as K.28.3 by M-PHY) followed by one or more data symbols (e.g., 0x8A encoded as D.17.2 by M-PHY). All symbols are transmitted in the initial (reset) M-PHY transmission mode, PWM/G1. For D-PHY, the TRG_UPR3 could be defined as the STOP state followed by the Unknown-3 Trigger.

Figure 5:
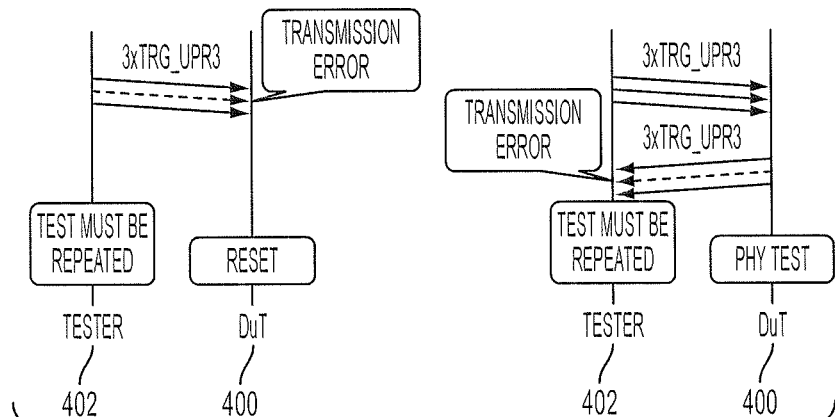
FIG. 5 shows PHY test mode signaling cases according to an exemplary embodiment.

As shown in FIG. 5, in one embodiment, if there is a transmission error on the UpLink, the DuT 400 does not enter the PHY test mode. This is detected at the Tester 402 by seeing a response other than TRG_UPR3 or no response at all. In the case of a transmission error on the DownLink, the Tester 402 will detect a sequence other than TRG_UPR3. If the Tester 402 detects an error in the PHY-test link startup sequence, the test failed due to transmission errors and the test needs to be repeated. Errors could also be detected during PACP configuration (PACP protects its data with a CRC), in which case, again, the PHY test must be repeated. If either the DuT 400 or the Tester 402 do not receive a predetermined number, e.g., three, of special PHY-test mode sequences, then the test is aborted and/or repeated as shown in FIG. 5.

In PHY test mode according to this exemplary embodiment, the DuT 400 offers only two functionalities: PHY and TGA configuration, and outgoing traffic generation and incoming traffic analysis. In UniPro, the PHY and TGA are configured using the already defined PHY Adapter and Configuration Protocol (PACP). PACP offers a full PHY configuration, including the number of lanes, power mode, speed gears, speed series, etc. In protocol mode, all active lanes in one direction have the same configuration. For PHY test mode, PACP is extended to also allow selective individual PHY lane configuration. Additionally, PACP is also extended to allow TGA configuration to the desired traffic pattern (e.g., pseudo-random bit sequence), and duration of the transmitted/analyzed traffic. PACP will also have means to collect the results of the Traffic Analyzer 304, such as the number of errors in the incoming data stream. Configuration can be performed by signalling between the Tester 402 and the DuT 400 using, e.g., L1.5 Config subprotocol messages, e.g., LP (D-PHY) and PWM/G1 (M-PHY). For example, the Tester 402 can place an L1.5 Config request message on the interconnect (after entering PHY test mode) to set the DuT attributes for the PHY test. The DuT 400 configures itself, e.g., in accordance with the received L1.5 Config message and provides an acknowledgement. For example, configuration can include one or more of setting the direction to be tested, e.g., DuT to Tester or vice versa, setting the active lane number(s), mode, series and gear.

Figure 6:
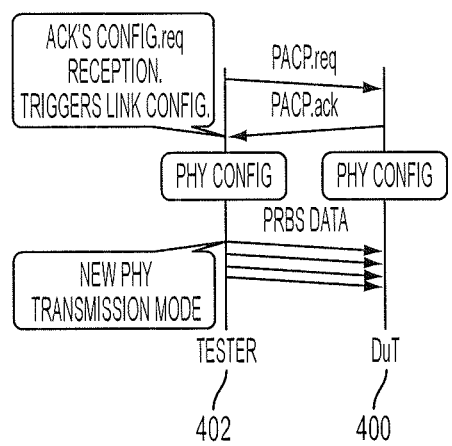
FIG. 6 depicts traffic signaling within a PHY test mode according to an exemplary embodiment.

After the PHY 202 and TGA 302, 304 are configured, the DuT 400 starts producing traffic on the DownLink and/or analyzing the traffic which it receives on the UpLink as shown in FIG. 6. From an implementation stand point, the TGA modules 302, 304 can either be implemented as a single instance, which is shared by all the lanes, or as one TGA module per lane. In the case of a single instance, the TGA can only generate the same traffic on all active DownLink lanes, and can only analyze identical traffic on all UpLink lanes. In the case of one TGA per lane, different traffic can be generated per DownLink lane, and different traffic can be received and analyzed per UpLink lane. The traffic during the PHY test mode can be implemented as PRBS signals or sequences.

Logic analyzers used in TGA modules 302, 304 are specialized units which perform signal generation and analysis which can generate and analyze sequences of digital signals, albeit not necessarily in real time. During the PHY test mode according to this exemplary embodiment user data (i.e., real traffic) is not transmitted between the devices. Switching between normal traffic mode and PHY testing mode can be performed by resetting the interconnect. Each lane can be tested individually in PHY testing mode, or multiple lanes can be tested together, e.g., for skew measurements. One PBRS (and one PBRS generator) can be used for all lanes or different PBRS (and multiple generators, e.g., with configurable seeds) can be used for different lanes. In the Tester to DuT direction, the DuT contains a PRBS sequence analyzer which checks the received sequence against an expected sequence and reports the error using an L1.5 Config message.

In the DuT to Tester direction, an L1.5 PRBS generator within the DuT can be triggered to produce PRBS sequences by the Tester using an L1.5 Config message, and the resulting PRBS sequences can be checked by the Tester upon receipt.

The L1.5 PRBS generator described above for usage in PHY test mode can, according to one exemplary embodiment, also be reused for randomized link idling. For example, when no data is received from Layer 2, Layer 1.5 can use its PRBS generator to send an idling data sequence. An idling data sequence can, for example, start with TRG_IDLING and end with MK0 or MK2. TRG_IDLING=<ESC_PA, TBD>=MK1+D.x.y. To avoid EMI issues for multiple lanes, various implementations can be considered. For example, if a single L1.5 PRBS is used for all lanes, then a delay or XOR with a constant can be applied per lane. If a different L1.5 PRBS is used per lane, then different seeds can be used to generate such PRBS sequences.

Other variations on the foregoing exemplary embodiments are considered. For example, according to one exemplary embodiment, the tester 402 can force bad sequences to test PHY corner cases, e.g., no MK2 when exiting BURST or sending 8b10b symbols without MK0 after PREPARE (DIF-P) in LS mode. 8b10b encoding can be included or omitted in M-PHY testing.

Figure 7:
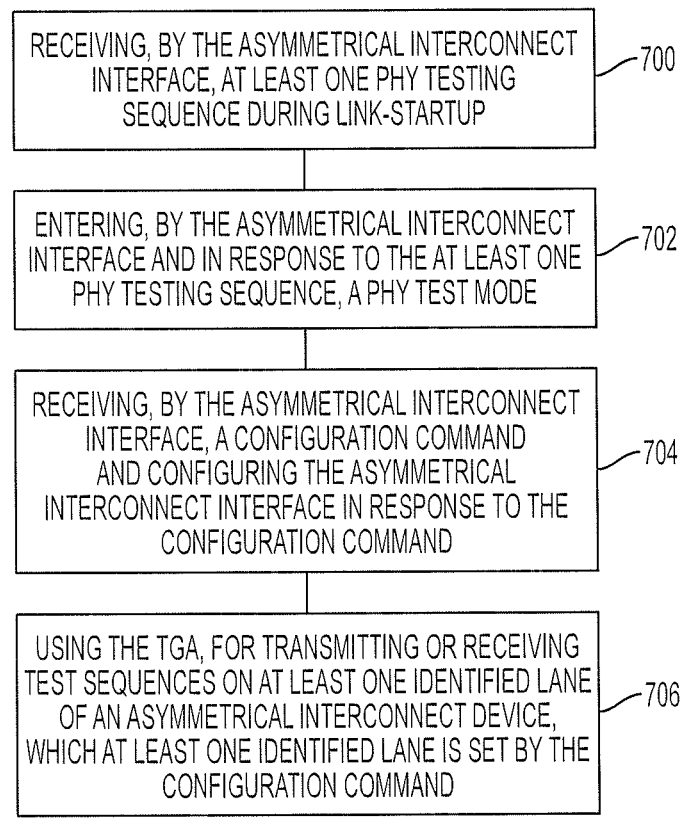
FIG. 7 is a flowchart illustrating a method of testing an asymmetrical interconnect interface according to an embodiment.

According to an embodiment, a method for physical layer (PHY) testing of an asymmetrical interconnect interface using a testing generator/analyzer (TGA) can include the steps shown in the flowchart of FIG. 7. Therein, at step 700, the asymmetrical interconnect interface receives at least one PHY testing sequence from the tester during link-startup. In response, at step 702, the asymmetrical interconnect interface enters into a PHY test mode. A configuration command is received, at step 704, which is used to configure the asymmetrical interconnect interface and TGA for testing. Then, the asymmetrical interconnect interface uses TGA to transmit or receive test sequences on at least one identified lane of an asymmetrical interconnect device, which at least one identified lane is set by the configuration command.

The above-described exemplary embodiments are intended to be illustrative in all respects, rather than restrictive, of the present invention. Thus the present invention is capable of many variations in detailed implementation that can be derived from the description contained herein by a person skilled in the art. No element, act, or instruction used in the description of the present application should be construed as critical or essential to the invention unless explicitly described as such. Also, as used herein, the article "a" is intended to include one or more items.

The invention claimed is:

1. A method for physical layer (PHY) testing of an asymmetrical interconnect interface using a traffic generator/analyzer (TGA), the method comprising:
   receiving, by the asymmetrical interconnect interface, at least one PHY testing sequence during link-startup;
   entering, by the asymmetrical interconnect interface and in response to the at least one PHY testing sequence, a PHY test mode;
   receiving, by the asymmetrical interconnect interface, a configuration command, and configuring the asymmetrical interconnect interface in response to the configuration command; and
   using, by the asymmetrical interconnect interface, the TGA for transmitting or receiving test sequences on at least one identified lane of an asymmetrical interconnect device in which at least one identified lane is set by the configuration command.

2. The method of claim 1, wherein the asymmetrical interconnect interface is configurable to transmit and receive on different numbers of lanes.

3. The method of claim 1, wherein the asymmetrical interconnect interface is adapted to operate with a unified protocol (UniPro) asymmetrical interconnect device.

4. The method of claim 1, wherein the configuration command also identifies an operating mode in which the asymmetrical interconnect interface is to operate during testing.

5. The method of claim 1, wherein the configuration command also identifies a transmission direction in which the asymmetrical interconnect interface is to operate during testing.

6. The method of claim 1, wherein the configuration command also identifies a speed in which the asymmetrical interconnect interface is to operate during testing.

7. The method of claim 1, wherein the test sequences are generated by a pseudo-random byte sequence (PBRS) generator.

8. The method of claim 1, further comprising resetting the testing of the asymmetrical interconnect interface if the at least one PHY testing sequence is not properly received by the asymmetrical interconnect interface.

9. The method of claim 1, further comprising:
   analyzing received test sequences; and
   reporting errors in the received test sequences.

10. The method of claim 1, further comprising:
    transmitting an acknowledgement of receipt of at least one of the PHY testing sequence and the configuration command.

11. A device comprising:
    an asymmetrical interconnect interface configured for physical layer testing using a traffic generator/analyzer (TGA) by receiving at least one physical layer (PHY) testing sequence during link-startup and entering, in response to the at least one PHY testing sequence, a PHY test mode;
    wherein the asymmetrical interconnect interface is further configured to receive a configuration command and to configure the asymmetrical interconnect interface in response to the configuration command; and
    the asymmetrical interconnect interface including the TGA configured to transmit or receive test sequences on at least one identified lane of an asymmetrical interconnect device in which at least one identified lane is set by the configuration command.

12. The device of claim 11, wherein the asymmetrical interconnect interface is configurable to transmit and receive on different numbers of lanes.

13. The device of claim 11, wherein the device further comprises the asymmetrical interconnect device connected to the asymmetrical interconnect interface.

14. The device of claim 11, wherein the configuration command also identifies an operating mode in which the asymmetrical interconnect interface is to operate during testing.

15. The device of claim 11, wherein the configuration command also identifies a transmission direction in which the asymmetrical interconnect interface is to operate during testing.

16. The device of claim 11, wherein the configuration command also identifies an operating speed in which the asymmetrical interconnect interface is to operate during testing.

17. The device of claim 11, further comprising:
a pseudo-random byte sequence (PBRS) generator configured to generate the test sequences to be transmitted by a transceiver.

18. The device of claim 11, wherein the asymmetrical interconnect interface is further configured to reset the testing of the asymmetrical interconnect interface if the at least one PHY testing sequence is not properly received by a transceiver.

19. The device of claim 11, wherein the TGA is further configured to analyze received test sequences; and
wherein the asymmetrical interconnect interface is further configured to report errors identified in the received test sequences by the TGA.

20. The device of claim 11, wherein the asymmetrical interconnect interface is further configured to transmit an acknowledgement of receipt of at least one of the PHY testing sequence and the configuration command.

\* \* \* \* \*

UNITED STATES PATENT AND TRADEMARK OFFICE
CERTIFICATE OF CORRECTION

PATENT NO. : 9,141,496 B2
APPLICATION NO. : 13/878329
DATED : September 22, 2015
INVENTOR(S) : Andrei Radulescu Page 1 of 1

It is certified that error appears in the above-identified patent and that said Letters Patent is hereby corrected as shown below:

On the Title Page

In Column 1, above Item (75), insert Item -- (71) Applicant: ST-Ericsson SA, Plan-les-Ouates (CH) --.

In Column 1, below "Title", Line 1, delete Item "(75)" and insert Item -- (72) -- , therefor.

In the Specification

In Column 4, Line 67, delete "{D-PHY]," and insert -- [D-PHY], --, therefor.

In Column 6, Line 62, delete "PBRS (and one PBRS" and insert -- PRBS (and one PRBS --, therefor.

In Column 6, Line 63, delete "PBRS" and insert -- PRBS --, therefor.

In Column 7, Line 27, delete "testing" and insert -- traffic --, therefor.

In the Claims

In Column 8, Line 19, in Claim 7, delete "(PBRS)" and insert -- (PRBS) --, therefor.

In Column 9, Line 2, in Claim 17, delete "(PBRS)" and insert -- (PRBS) --, therefor.

Signed and Sealed this
Third Day of December, 2019

Andrei Iancu
*Director of the United States Patent and Trademark Office*